United States Patent
Advani (10) Patent No.: US 10,324,266 B1
(45) Date of Patent: Jun. 18, 2019

(54) LED LIGHT PROJECTION WITH MULTIPLE LENSES

(71) Applicant: Vinay Advani, Hoboken, NJ (US)

(72) Inventor: Vinay Advani, Hoboken, NJ (US)

( * ) Notice: Subject to any disclaimer, the term of this patent is extended or adjusted under 35 U.S.C. 154(b) by 0 days.

(21) Appl. No.: 15/869,789

(22) Filed: Jan. 12, 2018

(51) Int. Cl.
*G03B 21/14* (2006.01)
*G02B 7/02* (2006.01)
*G03B 21/20* (2006.01)

(52) U.S. Cl.
CPC .......... *G02B 7/021* (2013.01); *G03B 21/145* (2013.01); *G03B 21/2013* (2013.01); *G03B 21/2033* (2013.01); *G03B 21/2046* (2013.01)

(58) Field of Classification Search
CPC . G03B 21/14; G03B 21/2013; G03B 21/2046
USPC .......... 353/1, 39, 42, 94, 111; 362/227, 232, 362/249.06
See application file for complete search history.

(56) References Cited

U.S. PATENT DOCUMENTS

| | | |
|---|---|---|
| 1,523,992 A | 1/1925 | Hadley |
| 1,577,388 A | 3/1926 | Twyman |
| 5,113,332 A | 5/1992 | Richardson |
| 8,100,540 B2 * | 1/2012 | Huebner ................ B60K 35/00 352/87 |
| 8,362,252 B2 * | 1/2013 | Kuroda ................ C07D 417/04 546/157 |
| 8,545,028 B2 * | 10/2013 | Fischer .................. G03B 21/50 352/87 |
| 2012/0121244 A1 * | 5/2012 | Stavely ................... F21V 5/007 396/175 |
| 2013/0027442 A1 * | 1/2013 | Jorgensen ............. F21S 10/007 345/690 |

FOREIGN PATENT DOCUMENTS

CN 104279521 1/2015

* cited by examiner

*Primary Examiner* — William C. Dowling
(74) *Attorney, Agent, or Firm* — Royal W. Craig; Gordon Feinblatt LLC (57) ABSTRACT

An LED light projector comprising a housing, a motor seated in the housing, and a projection carousel mounted distally on the motor and configured to rotate therewith in the housing. The projection carousel comprises a disk with a plurality of windows each having a plano-convex lens mounted therein. In addition, an LED circuit board is mounted on the motor, the LED circuit board including a number of LEDs for emitting a plurality of light beams. A focal assembly is mounted on the motor overtop the LED circuit board and it too includes windows each having a plano-concave lens for collimating the light beams. A partition is mounted in the housing adjacent (outside) the focal assembly and projection carousel, and it includes windows each having a removable image slide for passing the light beams and projecting an image thereon. The projected images result in a unique kaleidoscopic pattern.

12 Claims, 8 Drawing Sheets

LED LIGHT PROJECTION WITH MULTIPLE LENSES

BACKGROUND OF THE INVENTION

1. Field of the Invention

The present invention relates generally to decorative lighting and, more particularly, to an LED light projector with six interchangeable image frames.

2. Description of the Background

The use of lighting to accent the look of a place or thing dates back to ancient times when torches were arranged in patterns. Today, electrical lighting has given much more design flexibility. For example, in Washington D.C. the Capitol Building uses lights to make the dome stand out for many miles so it looks prominent and the lighting adds shading to this historic place. Many capitols, monuments, historic sights, museums or stately buildings use this type of accent.

In addition to accenting, lighting can be a decoration unto itself. For example, given any blank screen or bare wall an image can be projected of a Christmas scene that adds holiday spirit to the otherwise bland appearance of the stark wall or screen.

Projection lighting of a kaleidoscope image was introduced by Walter Hadley in U.S. Pat. No. 1,523,992 back in 1923. His initial development was not for decoration, but Twyman in U.S. Pat. No. 1,577,388 added a varying projectile in the use of the projecting kaleidoscope for decorative purposes. His early invention allowed varying projectiles of image to circulate in front of a light source to create the projected kaleidoscopic images.

In U.S. Pat. No. 5,113,332 Richardson explains the use of varying images that interchange in the light beam thus imparting multiple images through the lens in a repeatable fashion. The variation of the images, but constant timing of the rotation of the images along with motion of the images as the wheel for the images rotates around an axis is unique and the start of a new cycle in light image projection.

Disco lighting made its advent in the sixties and seventies and usually used several different mirror discs together with other special effects like color filters or shutters. The light passes through the various gobos and varying angles and it creates a spinning seemingly uncontrolled array of various shapes and colors in a usually one directional pattern.

All the inventions mentioned above and others were excellent developments in the use of lighting for decorations. They served us well, but they all have flaws that needed to be addressed.

First they were all based in some manner on the incandescent light bulb. In order to reach the brightness, often they were halogen, which is a brighter filament caused by the use of special gases within the glass, and usually a clearer glass. These bulbs use significant amounts of energy, have a short life compared to LED Lights, and they are hot to the touch.

In China Application CN 104279521 we find the use of LED Lighting first used to project images that have movement. There is a tube with a row of these lights and the film rotates around the tube light creating moving images of stars on the surface desired to be decorated.

Our Invention is a better use of LED Lighting that builds upon the technologies of the past, yet creates new art in this field of decorative projection lighting.

SUMMARY OF THE INVENTION

It is an object of the invention to provide an LED light projector with six interchangeable image frames.

It is another object to provide an LED light projector with integral exhaust fan to pull out the heat generated from said motors and lights.

It is another object to provide an LED light projector with a rotating carousel of image frames and independent rotating carousel of lenses, concave or convex, that alter the projection path along ever changing patterns as the frames and lens move around a rotation axis.

In accordance with the foregoing objects, the present invention is an LED light projector comprising a housing, and a motor seated in the housing. The motor extends a rotor to a projection carousel mounted distally on the rotor, and configured to rotate therewith within the housing. The projection carousel comprises a disk with a plurality N of windows each having a plano-convex lens mounted therein. In addition, an LED circuit board is mounted on the motor, the LED circuit board including a number M of LEDs for emitting a plurality of light beams. A focal assembly is mounted on the motor overtop the LED circuit board and it too includes M of windows each having a plano-concave lens mounted therein for collimating the plurality of diffuse light beams. A partition is mounted in the housing adjacent (outside) the focal assembly and projection carousel, and it includes M windows each having a removable image slide framed therein for passing one of the light beams and projecting an image thereon. The number of windows M on the projection carousel is greater than the number N of projected images resulting in a unique kaleidoscopic pattern.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Reference will now be made in detail to preferred embodiments of the present invention, examples of which are illustrated in the accompanying drawings.

Figure 1:
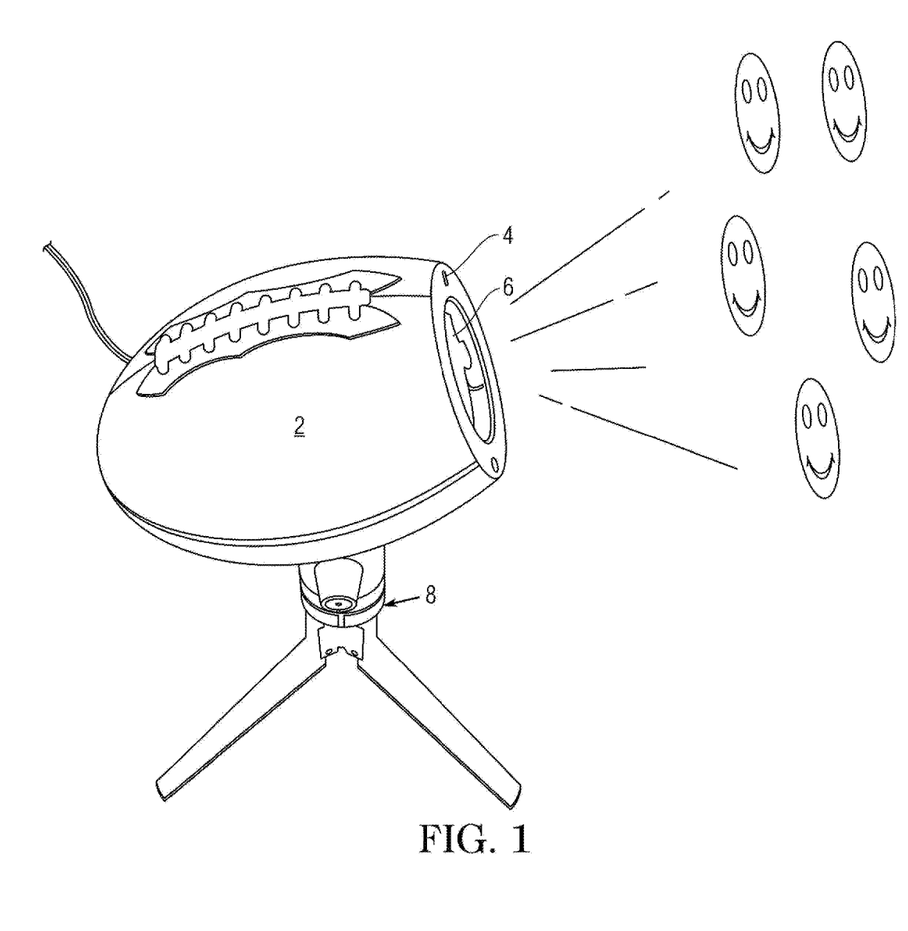
FIG. 1 is a side perspective view of the LED light projector according to the invention.
Figures 2, 3:
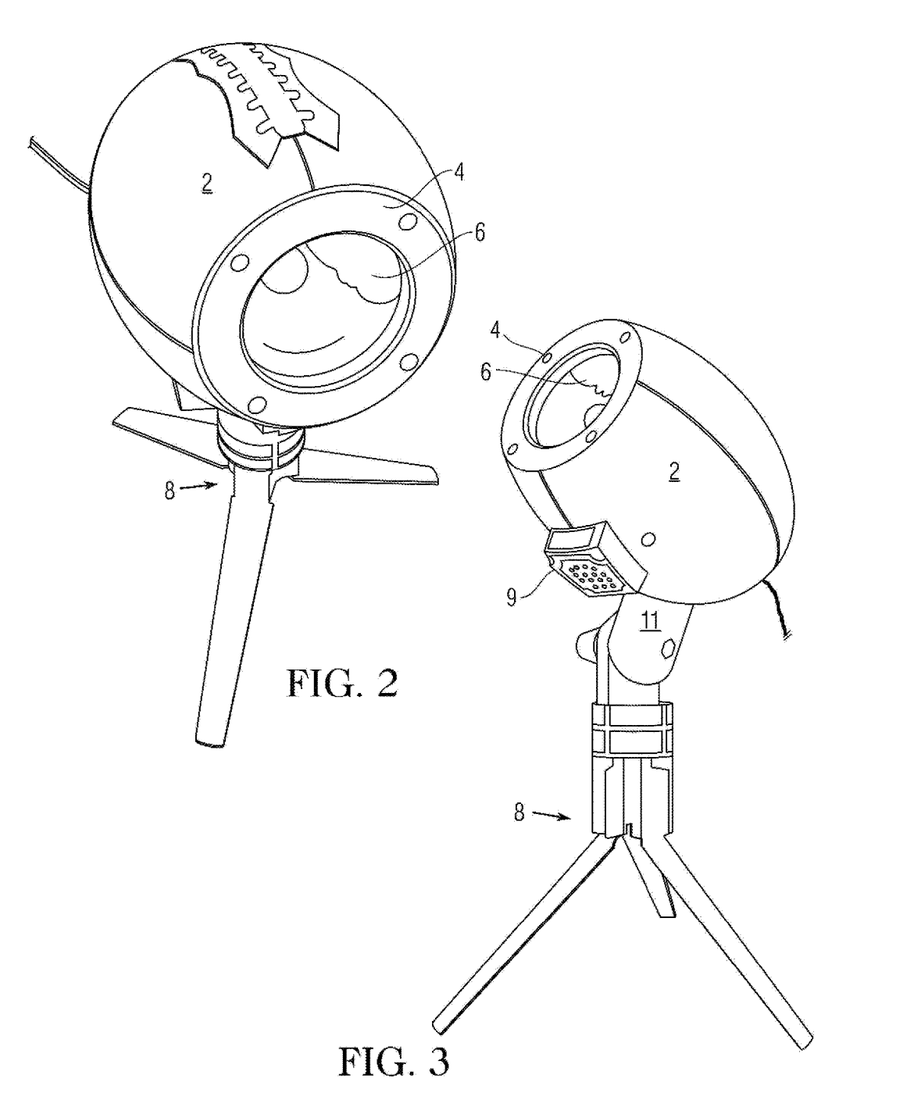
FIG. 2 is a front perspective view of the LED light projector as in FIG. 1.
FIG. 3 is a front perspective view of the LED light projector as in FIGS. 1-2 from the underside.

As best seen in FIGS. 1-3, the LED light projector generally includes a sectionalized two-piece ornamental housing 2, in this embodiment an ovoid shaped to resemble a football, truncated at one end to define an aperture surrounded by an aperture ring 4 retaining a flat clear plastic lends 6. The housing 2 is elevated by a folding tripod 8, and an electrical cord enters housing 2 at one end opposite the aperture. In operation, the light pattern produced by said projector comprises six separate light beams all projecting a selectable image, the images growing in size and intensity then shrinking and fading, and merging with the other beams/images in a circular pattern. This unique pattern of light beams depends on the geometric arrangement of internal LED diodes (4) and various lenses to be described.

As best seen in FIG. 3 the lower portion of the housing 2 in front of the tripod 8 includes an underhanging ventilated compartment 9 containing a fan. The lower portion of the housing 2 behind the tripod 8 includes an aperture for exposing a slide-switch 13 to actuate and control the unit. The tripod 8 is any suitable portable plastic foldable tripod stand pivotally secured to the housing 2 at a neck 11 that protrudes downward behind ventilation compartment 9.

Figure 4:
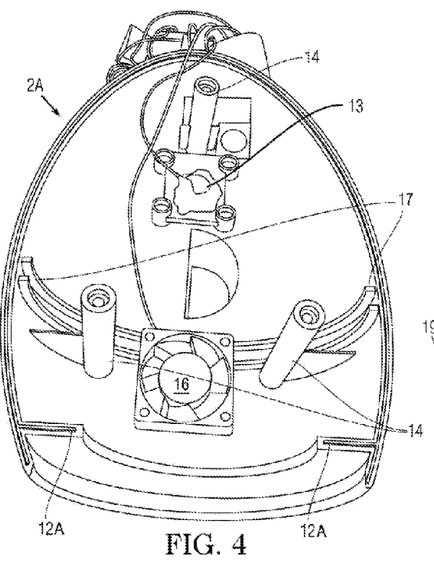
FIG. 4 is a sectional view of the bottom section of the LED light projector of FIGS. 1-3.
Figure 5:
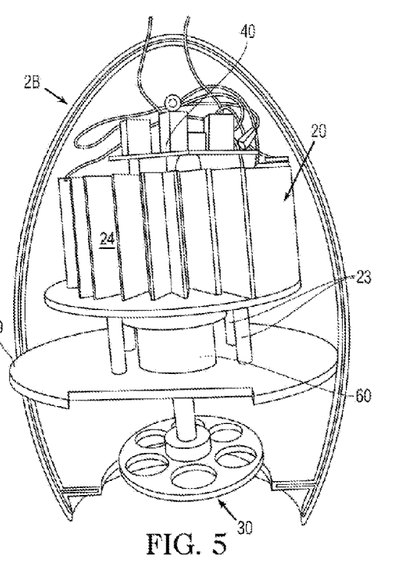
FIG. 5 is a sectional view of the top section of the LED light projector of FIGS. 1-4.

FIG. 4 shows the bottom section 2A and FIG. 5 shows the top section 2B of housing 2, both of which are open-ended half-sections indexed together by inter-fitting tongue-and-groove edges 12A, 12B and screwed together at a plurality of projecting screw-posts 14. As seen in FIG. 4, a 12V 2 pin 25 mm×25 mm×10 mm mini brushless cooling fan 16 is glued or otherwise secured in the ventilation compartment. A multi-position slide-switch 13 is glued or otherwise secured in the switch compartment.

As seen in FIG. 5, a projection assembly 20 is mounted inside the housing section 12B and includes a motor 22 that extends an elongate rotor through a removable partition 19. The partition 19 seats within opposing tracks 17 in the bottom section 2A of housing and supports the rotor of motor 22. The partition 19 is set-off from the motor 22 by spacer legs 23, which provide room for a focal assembly 60 there between (to be described). A lens carousel 30 is mounted on the distal end of the rotor just inside the aperture ring 4 in housing 2 and is rotated therein by motor 22. The motor 22 is encased in a surrounding aluminum heat sink 24 with cooling fins as shown. A power supply PCB 40 is mounted on one side of the motor 22, and an LED PCB 50 is mounted on the other side. The LED PCB 50 bears a radial array of four (4) high intensity LEDs with integral lenses. The focal assembly 60 is mounted directly in front of the LED PCB 50 as described below and includes a radial array of circular windows each containing a plano concave lens 64 to collimate the four beams from the LED PCB 50.

Figure 6:
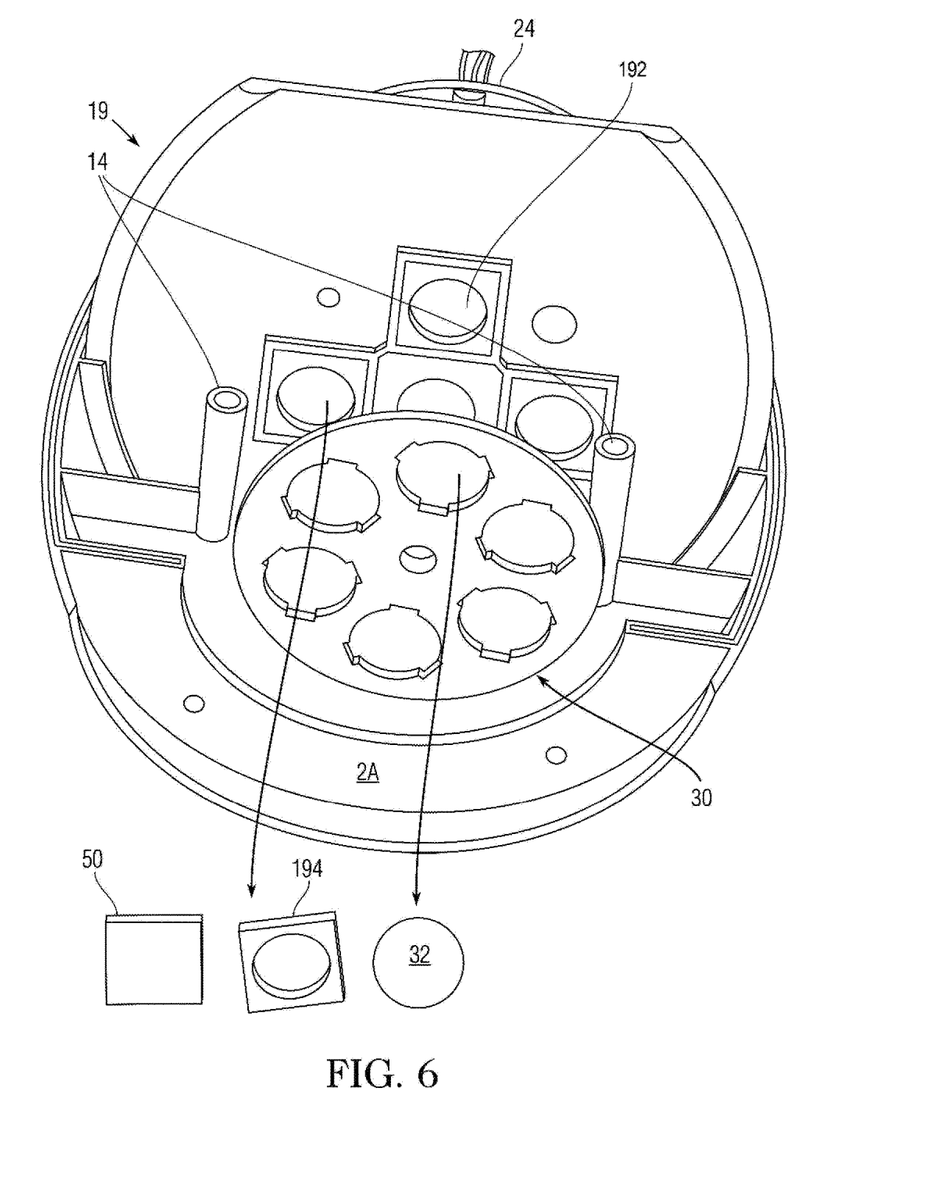
FIG. 6 is a close up internal view of the bottom section of the LED light projector of FIGS. 1-3.

FIG. 6 illustrates the principle of operation. The removable partition 19 is likewise formed with a radial array of four (4) circular windows spaced at a diameter equal to that of focal assembly 60. Four small square film parquettes 52 are held captive in the partition 19, each parquette 52 being a square slide bearing a desired ornamental pattern. Each slide parquette 52 is framed in the partition 19, seated over a circular aperture and within a square frame 192 formed in partition 19. The parquettes 52 are held captive by a conforming framing inset 194 that fits within frame 192 leaving the film parquettes 52 exposed. The lens carousel 30 seats six (6) plano-convex plastic lenses 32 directly in front of the partition 19. The six (6) plano-convex plastic lenses 32 rotate around the four (4) slide parquettes 52, and each resolves the lighted image therefrom into a collimated projection beam. The size and intensity of each beam grows as each lens 32 nears a corresponding slide parquette 52, and wanes as it moves away. This presents the decorative kaleidoscope projection effect. Moreover, since the partition 19 is removable the four slide parquettes 52 can be removed and replaced with others as desired. The lens carousel 30 is a circular plastic disk with a hub screwed to the rotor of motor 22 and six (6) radially-spaced windows for fixedly seating the six (6) plano-convex plastic lenses 32, flat sides facing inward toward the four slide parquettes 52. Each framing inset 194 is a plastic square with circular window.

Figure 7:
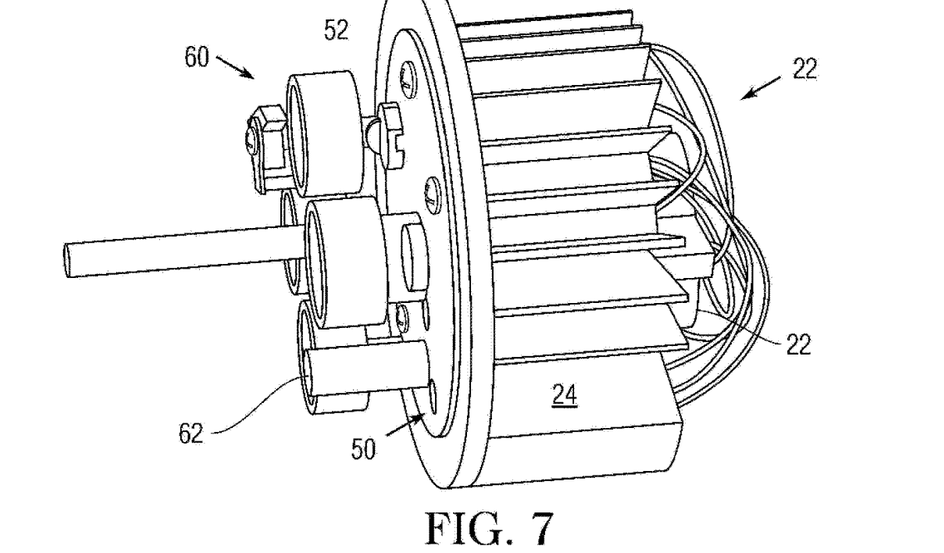
FIG. 7 is a side view of the motor assembly 10 of the LED light projector of FIGS. 1-3.
Figure 8:
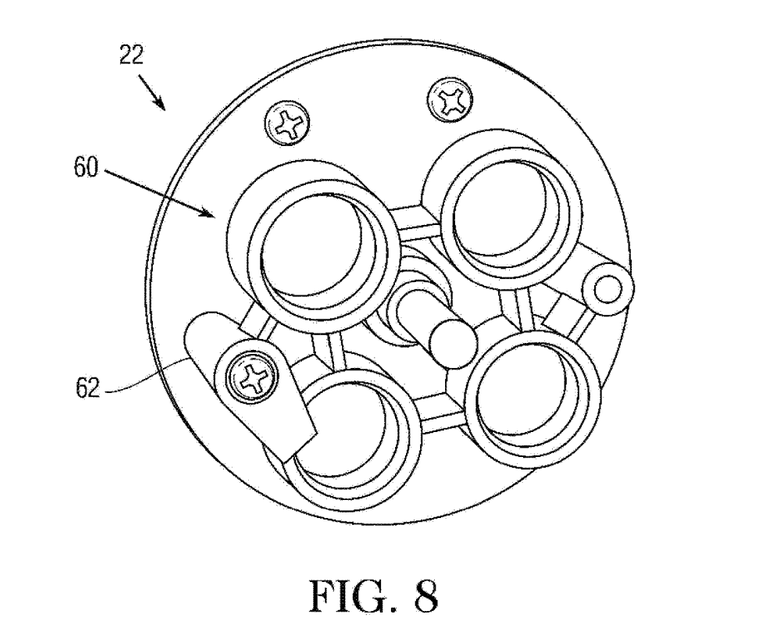
FIG. 8 is a side view of the motor assembly 10 of the LED light projector of FIGS. 1-7.

FIGS. 7 and 8 are a side view and front view, respectively, of the motor 22 complete with LED driver PCB 40 on one side, LED PCB 50 on the other, and diffuser ring 60 mounted to motor 22 and supported over the LED PCB 50. The LED PCB 50 is a circular PCB disk with four surface-mount high power LEDs thereon, each a single color white and each with a polycarbonate plano-convex lens there over. Each LED on the LED PCB 50 is powered from the LED driver PCB 40 which is likewise a circular PCB disk mounted on the other side of motor 22 and containing the power supply circuitry. The focal assembly 60 comprises a radial array of four plano-concave lenses each seated within a circular frame and spaced on standoffs 62 approximately 0.25" in front of the LED PCB 50. Each LED on the LED PCB 50 emits a diffusing cone of light into the lenses of focal assembly 60, which then collimates the four rays into accurately-focused parallel rays. The collimated rays pass through the respective slide parquettes 50 in partition 19 to form images corresponding thereto. The four collimated images emitted from focal assembly 60 are picked up by the rotating lens carousel 30 and projected there through and out through the aperture 6 as a kaleidoscope pattern.

The motor 22 is preferably a low speed DC electric motor rotates within a range of from 1-10 rpm at 12 VDC, and most preferably 5 rpm.

Figure 9:
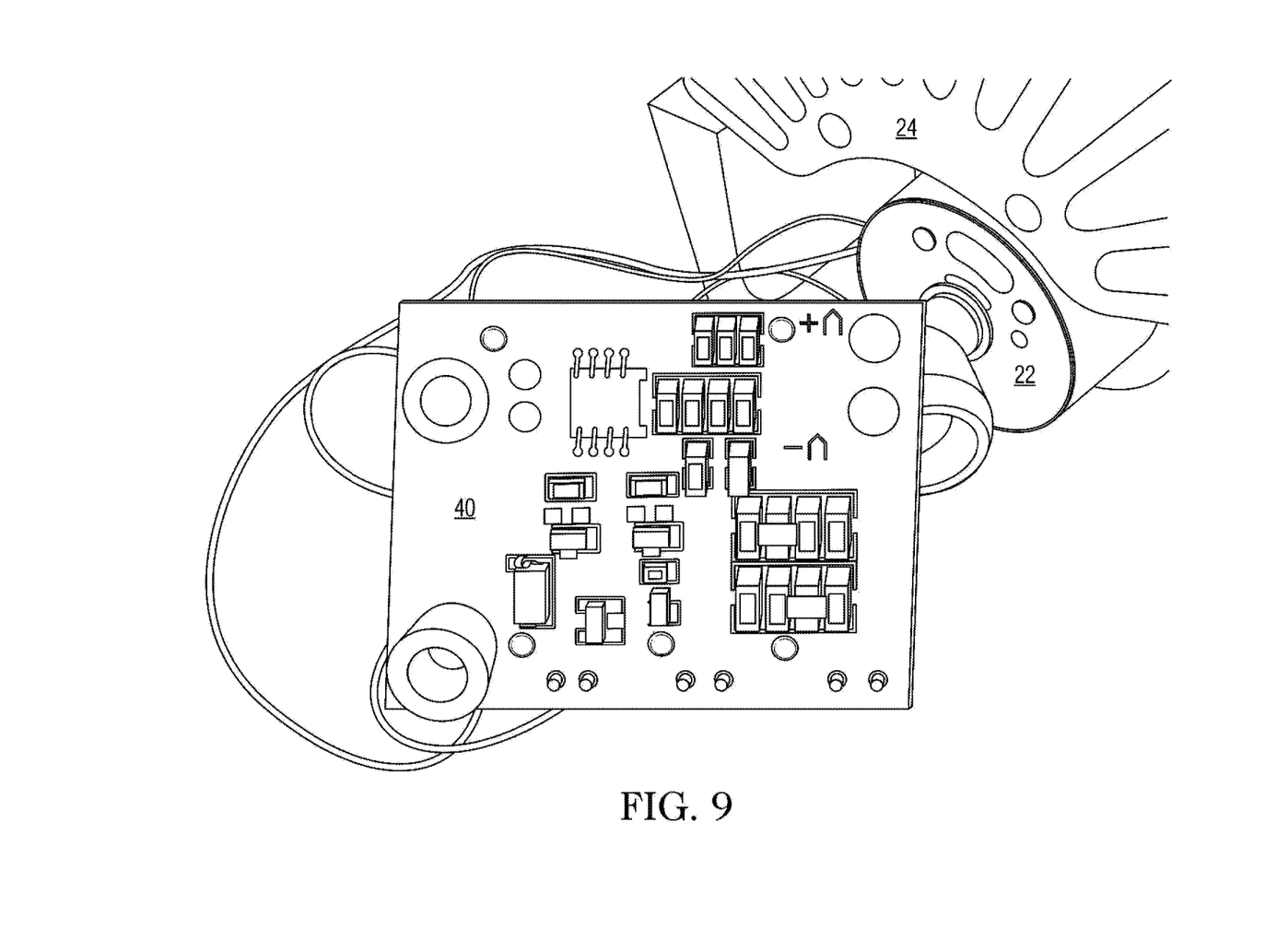
FIG. 9 is a front view of the circuit board 20.

FIG. 9 is a front view of the power PCB 40 which includes 1) a conventional 4-channel constant current LED driver circuit, 120 VAC to 12 VDC regulator up to 1 A current, with a single on/off control connected to slide switch 13; and 2) a similar 120 VAC to 12 VDC regulator up to 1 A current for driving motor 22; and 3) a similar 120 VAC to 12 VDC regulator up to 1 A current for driving fan 11.

Figure 10:
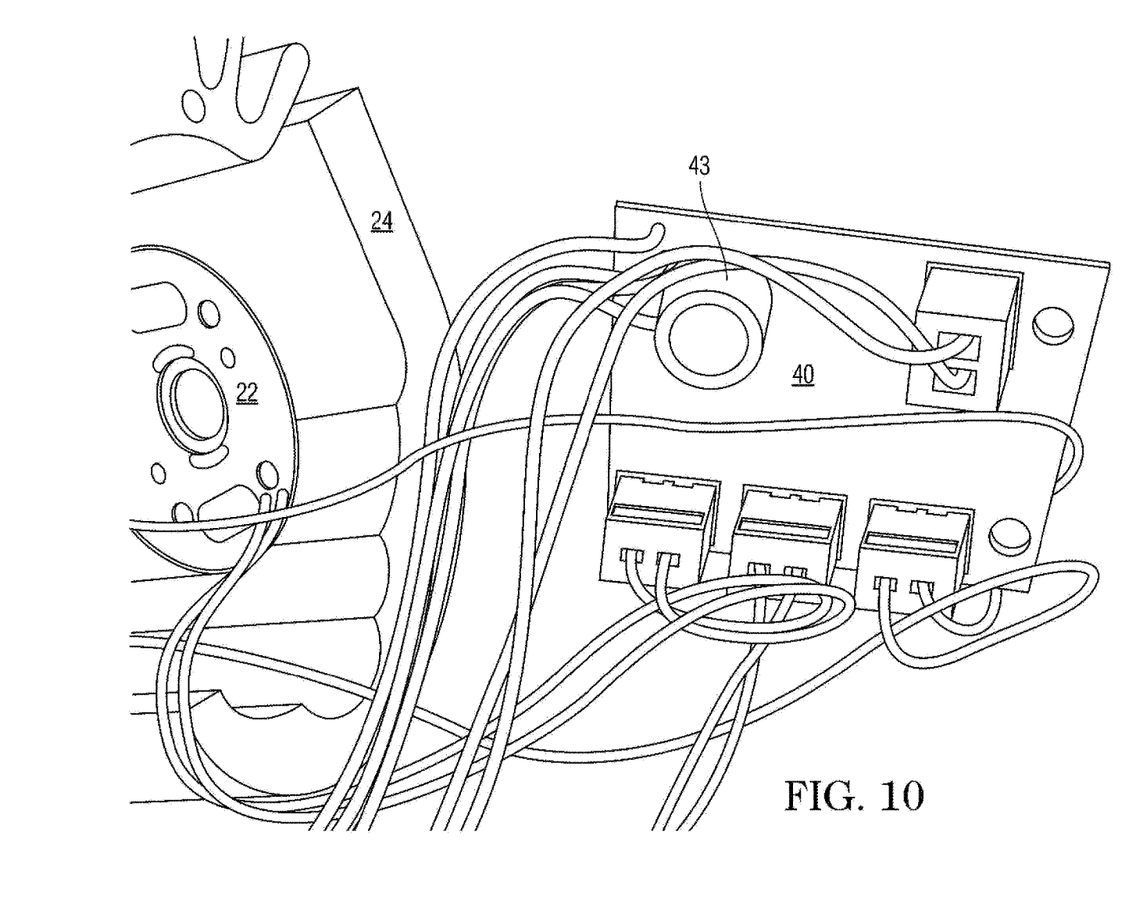
FIG. 10 is a rear view of the circuit board 20 of FIG. 9.

FIG. 10 is a rear view of the power PCB 40 which includes three surface mount electrical connectors, one for the LED PCB 50, one for the fan, and one for the driving motor 22, all of which are connected thereto by wires. The driving motor circuit also includes a matched starting capacitor 43.

Figure 11:
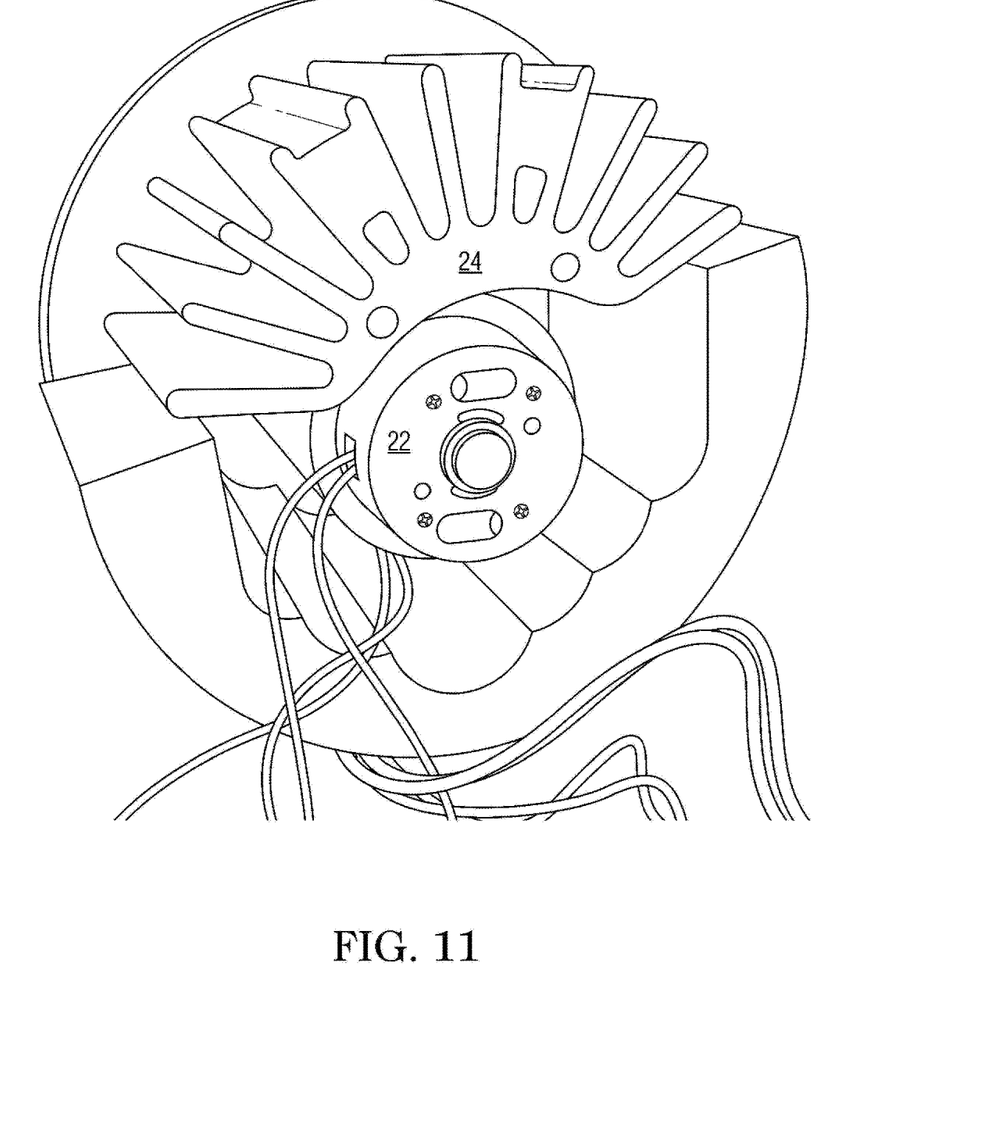
FIG. 11 is a close-up view of the motor 12.

Finally, FIG. 11 is a close-up view of the motor 22 mounted coaxially inside the heat sink 24, with power PCB 40 removed. Note the pass-through wiring through heat sink 24 to the LED PCB 50 on the other side.

One skilled in the art will understand that the foregoing must comply with UL standards and electrical codes.

Although the present subject matter has been described with reference to specific exemplary embodiments, it will be evident that various modifications and changes may be made to these embodiments without departing from the broader spirit and scope of the subject matter. Accordingly, the specification and drawings are to be regarded in an illustrative rather than exhaustive or to limit the invention to the precise forms disclosed.

For example, one or more of the lenses mounted in the projection carousel may be mounted with off-center (non-parallel) focal axes to vary the projection pattern. In another embodiment the lenses may be movable to vary the respective focal axes. For example, the lenses may be mounted on axes for pivoting to vary the lens angle of light projection there through.

Many variations and modifications of the embodiments described herein will be obvious to one of ordinary skill in the art in light of the above disclosure. The scope of the invention is to be defined only by the claims, and by their equivalents.

What is claimed is:

1. An LED light projector, comprising:
a housing;
a motor seated in the housing, the motor having a rotor;
a projection carousel disk comprising a plurality N of radially-spaced windows each having a lens mounted therein, mounted on the rotor, and configured to rotate therewith within the housing;
an LED circuit board mounted in the housing and including a number M LEDs for emitting an equal number of light beams;
a focal assembly comprising a disk mounted on the motor and having a plurality M of windows each having a lens mounted therein; and
a partition mounted in said housing adjacent the focal assembly and projection carousel.

2. The LED light projector according to claim 1, wherein said partition has a plurality M windows.

3. The LED light projector according to claim 2, wherein each of said plurality M windows has a removable image slide framed therein for projecting an image on a corresponding one of said light beams.

4. The LED light projector according to claim 3, wherein the number of windows M on the projection carousel is greater than the number N of projected images resulting in a unique kaleidoscopic pattern.

5. The LED light projector according to claim 3, wherein the number M is six.

6. An LED light projector, comprising:
a housing;
a motor seated in the housing, the motor having a rotor;
a projection carousel mounted on the rotor and configured to rotate therewith within the housing;
an LED circuit board mounted in the housing and including a number M LEDs for emitting an equal number of light beams; and
an integral exhaust fan adjacent said motor to extract heat generated therefrom.

7. The LED light projector according to claim 6, further comprising a focal assembly comprising a disk mounted on the motor and having a plurality M of windows each having a lens mounted therein; and wherein said lenses mounted in said plurality of M disk windows have non-parallel focal axes.

8. The LED light projector according to claim 1, wherein at least two of said lenses mounted in said plurality of M disk windows have non-parallel focal axes.

9. The LED light projector according to claim 1, wherein said lenses mounted in said plurality of M disk windows have variable focal axes.

10. The LED light projector according to claim 1, wherein the lenses mounted in the lens projection carousel are pivotable to vary the lens angle of light projection there through.

11. An LED light projector, comprising:
a housing;
a motor seated in said housing, said motor extending a rotor;
a projection carousel mounted distally on said rotor and configured to rotate therewith within said housing, said projection carousel comprising a disk with a plurality N of windows each having a plano-convex lens mounted therein;
an LED circuit board mounted on said motor, said LED circuit board including a plurality M of LEDs for emitting a plurality of light beams;
a focal assembly mounted on said motor between said LED circuit board and projection carousel, said focal assembly including a plurality M of windows each having a plano-concave lens mounted therein for collimating said plurality of diffuse light beams;
a partition mounted in said housing between said focal assembly and projection carousel, said partition including a plurality M of windows each having a removable image slide framed therein for passing one of said plurality M of diffuse light beams and projecting an image thereon;
whereby said plurality N of windows on said projection carousel is greater than said plurality M of diffuse light beams so as to project a kaleidoscopic pattern.

12. An LED light projector comprising:
a housing;
a motor seated in the housing;
a projection carousel mounted on the motor and configured to rotate therewith, the projection carousel comprising a disk with a plurality of windows each having a lens mounted therein;
a light source mounted on the motor;
a focal assembly mounted on the motor, the focal assembly comprising a plurality of windows each having a lens mounted therein;
a partition mounted in the housing adjacent the focal assembly and projection carousel, said partition comprising a plurality of windows each having an image slide mounted therein;
wherein a projected image forms a moving kaleidoscopic pattern.

* * * * *